Figure 1:
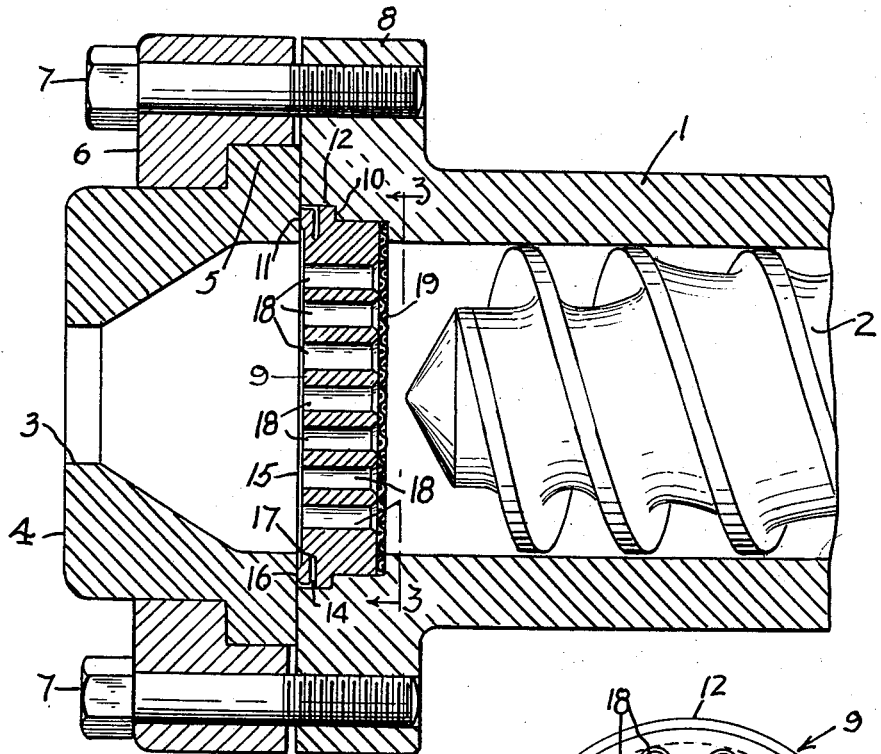

Feb. 9, 1960  A. DE GHETTO  2,923,972
EXTRUDER AND STRAINER PLATE THEREFOR

Filed July 10, 1957

INVENTOR.
ANSELM De GHETTO
BY
Oberlin + Limbach
ATTORNEYS.

United States Patent Office 2,923,972
Patented Feb. 9, 1960

2,923,972

EXTRUDER AND STRAINER PLATE THEREFOR

Anselm DeGhetto, Clifton, N.J., assignor to National Rubber Machinery Company, Akron, Ohio, a corporation of Ohio Application July 10, 1957, Serial No. 671,084

7 Claims. (Cl. 18—12)

The present invention relates as indicated to an extruder and strainer plate therefor and more particularly to an extruder of the type that comprises a cylinder or barrel having a feed opening adjacent one end for the introduction of plastic material to be plasticized and worked therein and having a die or discharge opening at the other end from which the plasticized material is extruded, and a feed screw rotatable in said barrel effective to work and to exert pressure on the material and to advance it longitudinally of the cylinder from such feed opening toward such discharge opening.

In such screw-type extruder it has been found desirable to provide a screen or strainer plate extending across the end of the cylinder in a zone between the discharge opening and the end of the feed screw for the purpose of holding back unmelted particles of the material and additionally, to build up a sufficiently high back pressure on the material to increase its bulk density as it is being melted, worked, and fed by the feed screw.

Hitherto, it has been the practice to clamp a solid, heavy strainer plate between the extrusion die and the end of the cylinder as by means of a plurality of clamping screws. However, it has been found that such screws elongate under the influence of the back pressure of the material in the cylinder and in the die tending to force the strainer plate and die away from the end of the cylinder whereby leakage of material occurs around said strainer plate. The plastic material that leaks around the strainer plate has prolonged contact with the heated strainer plate and cylinder and therefore may decompose or discolor thereby contaminating the strained material which is being extruded from the discharge orifice of the die.

Accordingly, it is a principal object of this invention to provide an extruder and a resilient strainer plate therefor in which the latter has a resilient portion effective to maintain a fluid-tight seal when clamped between the ends of the die and the cylinder despite any such elongation of the clamping screws.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 2:
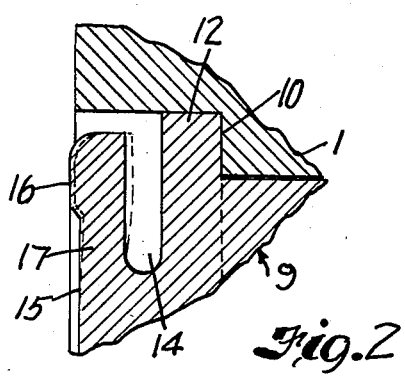
Figure 3:
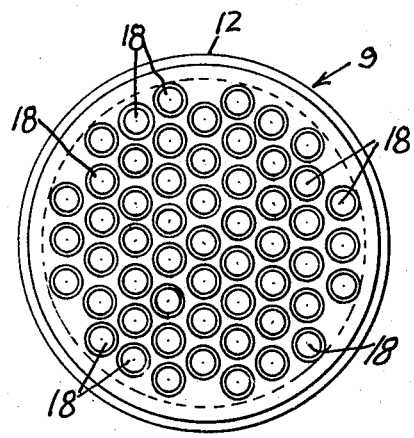

In said annexed drawing:

Fig. 1 is a diametrical cross-section view through the discharge end portion of a screw-type extruder having the instant strainer plate clamped therein;

Fig. 2 is a fragmentary radial cross-section view on enlarged scale showing in full lines the initial form of the strainer plate and showing in dotted lines the manner in which a resilient flange thereof is flexed so as to maintain a fluid seal irrespective of elongation of the die clamping screws; and, Fig. 3 is an elevation view of the strainer plate by itself as viewed along the line 3—3, Fig. 1.

Referring now in detail to the drawing, the reference numeral 1 denotes the end portion of an extruder cylinder or barrel in which a feed screw 2 is rotatable to advance plastic material toward the left and to work, mix, and plasticize the material as thus advanced. The feed opening for the material is located at the right hand end of said cylinder 1 and is not shown herein. As viewed in Fig. 1, the feed screw 2 serves to advance the material toward the left for extrusion through the discharge orifice 3 of the die 4.

Said die 4, as herein shown, is formed with a flange 5 with which a camping collar 6 is engaged so as to securely clamp the inner end face of said die 4 against the outer end face of said cylinder 1 by means of clamping screws 7 having threaded engagement with threaded holes formed in the flange 8 of said cylinder 1.

The outer end of said cylinder 1 is counterbored as shown to receive therein the strainer plate 9 and to provide with die 5 opposed clamping shoulders 10 and 11 between which the flange 12 of said strainer plate is clamped. The flange 12 of said strainer plate 9 is formed with a relatively deep peripheral groove 14 and the outer face thereof is recessed at 15 so as to leave an annular seating rib 16. By reason of the provision of peripheral groove 14 and recess 15, the seat 16 is integrally and resiliently joined to the plate proper through a neck portion 17 which allows that portion of flange 12 which is formed with the annular seat 16 to be axially flexed toward that portion of flange 12 which is disposed on the other side of the peripheral groove 14. In its normally undeformed condition (see Fig. 2) the thickness of the flange 12 is greater than the depth of the counterbore from the end of cylinder 1 to the shoulder 10 whereby as the clamping screws 7 are drawn up tight to bring the inner end face of the die 5 into metal-to-metal engagement with the outer end face of the cylinder 1, the annular seat 16 of said strainer plate 9 will resiliently engage the shoulder 11. Accordingly, even though the clamping screws 7 may elongate during the use of the extruder, said seat 16 will, by its resilient action, maintain a fluid-tight sealing contact with the die 5 so as to avoid contamination of the material passing through the die opening 3 by discolored or decompsed material that may otherwise have found its way around the strainer plate 9. It is further to be noted that there is resilient engagement between the inner face of flange 12 and the shoulder 10 to establish a seal there also. Accordingly, elongation of the screws 7 and consequent separation of opposed clamping shoulders 10 and 11 yet does not result in leakage of the plastic material.

The strainer plate 9 is relatively thick to resist bowing at the center and is formed with a multiplicity of countersunk holes 18 through which the material is forced by feed screw 2 into the die opening 3 for building up a required back pressure on the material for more efficient working, mixing, and plasticization thereof in cylinder 1. Said strainer plate serves also to strain out any unmelted lumps of material. If desired, one or more wire screens 19 may be placed across the inner face of the strainer plate 9 to further strain the material and to build up a yet higher back pressure, and in that case, the strainer plate 9 serves to back-up the screen 19.

In the case of an extruder having a 2½" diameter feed screw 2 and cylinder 1 it has been found that the thickness of the flange 12 may be made approximately 5% greater than the distance between the clamping shoulders 10 and 11, in this case about .007–.008", so as to more than adequately accommodate the elongation of the clamping screws 7. In one specimen, the strainer plate 9 was of nearly ½" thickness and had 55 uniformly arranged ¼" diameter holes 18 therethrough countersunk to ⁵⁄₁₆" diameter at their inlet ends. The annular seat 16 of said strainer plate was of about ¹⁄₁₆" radial width having an outside diameter of about 2¾" where tangent to the radiused outer corner. The neck portion 17 was of about .050" thickness and the groove 14 was of .030" width extending in from about 2⅞" outside diameter of flange 12 to a root diameter of about 2⁹⁄₁₆".

While it should be possible to pre-load the clamping screws 7 to the extent desired there may be some relief of the pre-loading due to heating of the extruder and screws. Moreover, fluid-tight sealing between unyielding metal parts is difficult to achieve; whereas, in the present case the seat 16 is capable of yielding varying amounts around the circumference thereof so that the die and cylinder surfaces 11 and 10 need not be absolutely parallel. In other words, in the present case there may be deviation from true perpendicular disposition of the die and cylinder surfaces 11 and 10 with respect to the longitudinal axis of the extruder while yet an efficient fluid-tight seal is attained not only at shoulder 11 but also at shoulder 10.

Other modes of applying the principle of the invention may be employed, change being made as regards the details described, provided the features stated in any of the following claims, or the equivalent of such, be employed.

I therefore particularly point out and distinctly claim as my invention:

1. An extruder comprising a cylinder; a feed screw rotatable in said cylinder to feed plastic material through said cylinder; an apertured strainer plate extending across the cylinder bore to impede flow of such plastic material; and screw-actuated clamping means for clamping the peripheral portion of said plate against said cylinder; said plate being integrally formed with a resiliently deformable portion that is resiliently deformed between said clamping means and said cylinder to preclude flow of plastic material past said plate, except through the apertures thereof, despite separation of said clamping means and said cylinder owing to elongation of the clamping screws, said plate being formed with a peripheral groove adjacent one end to define said deformable portion as a radially extending lip that is axially flexed when said plate is clamped as aforesaid.

2. The extruder of claim 1 wherein said lip has an annular, axially projecting sealing rib that resiliently engages said clamping means and that provides, inwardly thereof, a neck of reduced axial thickness about which said lip flexes axially.

3. An extruder comprising a cylinder; a feed screw rotatable in said cylinder to feed plastic material through said cylinder; a die at one end of said cylinder providing a discharge opening for the plastic material thus fed through said cylinder; clamping screws for mounting said die at the end of said cylinder; and an apertured strainer plate extending across the cylinder bore to impede free flow of such plastic material from said cylinder into said die, said plate being clamped between opposed shoulders of said cylinder and said die, and being integrally formed with a resiliently deformable peripheral lip portion which is effective to maintain resilient sealing engagement between said plate and such shoulders despite separation of such shoulders due to elongation of said screws during operation of the extruder, said plate having a peripheral groove formed adjacent one end to define said deformable peripheral lip portion as a radially extending lip that is axially flexed when said plate is clamped in the extruder.

4. The extruder of claim 3 wherein said resiliently deformable peripheral lip portion has an annular axially extending seat engaging the shoulder of said die.

5. The extruder of claim 3 wherein said resiliently deformable peripheral lip portion has an annular, axially projecting rib that engages the shoulder of said die and that provides a neck about which said portion is axially flexed when said plate is clamped between said die and said cylinder.

6. The extruder of claim 4 wherein a screen is provided between the inner end face of said plate and another shoulder formed in the end of said cylinder to further impede the flow of plastic material, said screen being backed-up by said plate.

7. An apertured strainer plate for an extruder including an integrally formed resiliently deformable portion adapted to preclude flow of plastic material past said plate, except through the apertures thereof, a peripheral groove formed adjacent one end to define said deformable portion as a radially extending lip that is axially flexed when said plate is clamped in such extruder, said lip having an annular, axially projecting sealing rib adapted resiliently to engage clamping means thereby holding said plate in such extruder, and said lip providing, inwardly thereof, a neck of reduced axial thickness about which said lip flexes axially.

References Cited in the file of this patent

UNITED STATES PATENTS

| | | |
|---|---|---|
| 2,341,555 | Jones | Feb. 15, 1944 |
| 2,539,128 | Gray | Jan. 23, 1951 |
| 2,539,129 | Gray | Jan. 23, 1951 |
| 2,553,076 | Bradley | May 15, 1951 |
| 2,607,954 | Schneider et al. | Aug. 26, 1952 |
| 2,754,542 | Henning et al. | July 17, 1956 |

FOREIGN PATENTS

| | | |
|---|---|---|
| 863,841 | Germany | Jan. 19, 1953 |